United States Patent
Wen et al.

(10) Patent No.: US 10,206,094 B1
(45) Date of Patent: Feb. 12, 2019

(54) MOBILE EDGE PLATFORM SERVERS AND UE CONTEXT MIGRATION MANAGEMENT METHODS THEREOF

(71) Applicant: Industrial Technology Research Institute, Hsinchu (TW)

(72) Inventors: Kuo-Wei Wen, Taoyuan (TW); Chun-Chieh Wang, Kaohsiung (TW); Jian-Hao Chen, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/843,190

(22) Filed: Dec. 15, 2017

(51) Int. Cl.
| | |
|---|---|
| *H04W 76/00* | (2018.01) |
| *H04W 8/08* | (2009.01) |
| *H04W 4/50* | (2018.01) |
| *H04W 64/00* | (2009.01) |

(52) U.S. Cl.
CPC .............. *H04W 8/082* (2013.01); *H04W 4/50* (2018.02); *H04W 64/006* (2013.01)

(58) Field of Classification Search
CPC ... H04W 36/14; H04W 24/02; H04W 84/005; H04W 84/047; H04W 76/27; H04W 36/0066; H04W 36/08; H04W 68/00; H04W 36/02; H04W 36/12; H04W 36/0009; H04W 36/165; H04W 60/00; H04W 76/34
See application file for complete search history.

(56) References Cited

U.S. PATENT DOCUMENTS

| | | |
|---|---|---|
| 8,982,738 B2 | 3/2015 | Li et al. |
| 9,430,213 B2 | 8/2016 | Fu et al. |
| 9,507,630 B2 | 11/2016 | Addepalli et al. |
| 9,635,594 B2 | 4/2017 | Synnergren et al. |

(Continued)

FOREIGN PATENT DOCUMENTS

TW    I581588 B    5/2017

OTHER PUBLICATIONS

Jake Roemer et al., "Improving Virtual Machine Migration via Deduplication," 2014 IEEE 11th International Conference on Mobile Ad Hoc and Sensor Systems, 2014, pp. 702-707, IEEE, US.

(Continued)

*Primary Examiner* — Quan M Hua

(57) ABSTRACT

A user equipment (UE) context migration management method applied to a mobile edge platform (MEP) for managing a UE context of a mobile communication device is provided. An embodiment includes: receiving a migration completion indication of a mobile communication device; obtaining source platform information corresponding to the mobile communication device according to the migration completion indication, wherein the source platform information at least includes a location information of a source MEP; and transmitting a first request to the source MEP according to the source platform information to obtain an pointer information of the UE context of the mobile communication device from the source MEP, wherein the pointer information at least indicates a location where the UE context of the mobile communication device locates and the location information of the source MEP.

20 Claims, 10 Drawing Sheets

(56) References Cited

U.S. PATENT DOCUMENTS

| | | | | |
|---|---|---|---|---|
| 2008/0049677 | A1* | 2/2008 | Hayashi | H04W 36/12 |
| | | | | 370/331 |
| 2017/0201571 | A1 | 7/2017 | Sherf et al. | |
| 2018/0242204 | A1* | 8/2018 | Zhu | H04W 36/0033 |

OTHER PUBLICATIONS

Yuki Ashino et al., "Virtual Machine Migration Method Between Different Hypervisor Implementations and Its Evaluation," 2012 26th International Conference on Advanced Information Networking and Applications Workshops, 2012, pp. 1089-1094, IEEE, US.

Duy Nguyen et al., "EBC: Application-level migration on multi-site cloud," 2012 International Conference on Systems and Informatics (ICSAI 2012), 2012, pp. 876-880, IEEE, US.

I. Farris et al., "Providing ultra-short latency to user-centric 5G applications at the mobile network edge," Transactions on Emerging Telecommunications Technologies, Mar. 2017, 15 pages, John Wiley & Sons Ltd., US.

Konstantinos Tsakalozos et al., "Live VM Migration under Time-Constrains in Share-Nothing IaaS-Clouds," IEEE Transactions on Parallel & Distributed Systems, Aug. 2017, pp. 2285-2298, vol. 28, Issue No. 8, IEEE, US.

Anju Mohan et al., "An optimized approach for live VM migration using log records," 2013 4th ICCCNT, Jul. 2013, 4 pages, IEEE, India.

Tariq Daradkeh et al., "Distributed Shared Memory Based Live VM Migration," 2016 IEEE 9th International Conference on Cloud Computing, 2016, pp. 826-830, IEEE, US.

"Boosting User Experience by Innovating at the Mobile Network Edge," presented by Nurit Sprecher, Nokia Systems and Mansoor Hanif, ETSI Webinar, Nov. 2015, 3 European Telecommunications Standards Institute, 5 pages.

Alan Law, "Mobile Edge Compute and Small Cell," 2016, Small Cell Forum Ltd., 11 pages, US.

"Edge Computing in the IoT: Forecasts, key benefits, and top industries adopting an analytics model that improves processing and cuts costs," Oct. 2016, Business Insider, 4 pages, US.

"Cisco Visual Networking Index: Global Mobile Data Traffic Forecast Update, 2016-2021," White Paper, Feb. 2017, 35 pages, Cisco, US.

David Floyer, "The Vital Role of Edge Computing in the Internet of Things," https://wikibon.conn/the-vital-role-of-edge-computing-in-the-internet-of-things, Oct. 2015, 8 pages, US.

"Mobile Edge Computing (MEC): Market Assessment and Forecasts 2016-2021," (https://www.giiresearch.com/report/min374387-mobile-edge-computing-mec-market-assessment.html), Oct. 2016, Mind Commerce, 102 pages, US.

"Mobile Edge Computing (MEC); Technical Requirements," ETIS GS MEC 002, Group Specification, Mar. 2016, European Telecommunications Standards Institute, 40 pages, France.

"Download Pre-configured Cloud Images for Linux & Windows—Unix Arena," https://www.unixarena.com/2015/08/download-pre-configured-cloud-images-for-linux-windows.html, printed from the internet on Mar. 8, 2018, 2 pages.

Brian Christner, "Docker Base OS Image Size Comparison," Jul. 2015, 6 pages, BrianChristner.io, US.

Prinkle Sharmaet al., "Securing wireless communications of connected vehicles with Artificial Intelligence," 2017 IEEE International Symposium on Technologies for Homeland Security (HST), Apr. 2017, 7 pages, IEEE, US.

\* cited by examiner

MOBILE EDGE PLATFORM SERVERS AND UE CONTEXT MIGRATION MANAGEMENT METHODS THEREOF

TECHNICAL FIELD

The technical field relates to mobile edge platform servers and associated UE context migration management methods thereof.

BACKGROUND

In a typical mobile communication environment, a user equipment (UE) may communicate voice and/or data signals with one or more service networks via cellular stations of the service networks. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Long Term Evolution Advanced (LTE-A) technology, and others.

In recent years, due to a substantial growth in cloud computing and network demand, a new generation of mobile communication system (5G) has been proposed. The new-generation mobile communication system has low latency, high loading and higher consistency feature requirements. In order to achieve the low-latency feature mentioned above, a new network framework known as Mobile Edge Computing (MEC) has come to be. MEC generally involves placing a server at the proximal end of the backhaul network of the base station and constructing a lightweight cloud that accommodates cloud computing and storage capabilities in order to intercept data sent back to the backend core network to the server for computing processing, thereby moving application services traditionally setup in the data center to the Mobile Edge Platform (MEP), allowing users to use application services deployed on the MEP and featuring the following advantages: (1) Nearby users can effectively decrease the service latency time; (2) Data on MEC can effectively reduce the load of data transmitted through the core network; (3) Provide service quality parameters at the wireless network end in order to ensure service quality, thereby enhancing user experience.

The existing MEC structure should support smart relocation. That is, when the user is accessing a service on MEP, if the user needs to move between MEPs to access new MEPs, the service in use must simultaneously carry out migration as the user moves. In the data center environment, the service data is located in the virtual machine/container on MEP. Conventionally, when a service is to be migrated, all the data in the virtual machine/container should be moved, resulting in time-consuming and huge data volume migration in excess. At the same time, in the MEC environment, if the user continues to move, switch to and access different MEPs, the virtual machine/container will need to constantly migrate, leading to diminished system performance. In addition, during service migration, since only newly added data in the original virtual machine/container is targeted for migration, the newly added data may not belong to the moving user, thus wasting network resources and transmission time.

SUMMARY

User equipment context migration management methods applied to a mobile edge platform and mobile edge platform servers applied to a mobile edge platform computing network are provided.

In an exemplary embodiment, a user equipment (UE) context migration management method applied to a mobile edge platform for managing a UE context of a mobile communication device is provided. The method comprises: receiving a migration completion indication of a mobile communication device; obtaining source platform information corresponding to the mobile communication device according to the migration completion indication, wherein the source platform information at least comprises location information of a source mobile edge platform; and transmitting a first request to the source mobile edge platform according to the source platform information to obtain pointer information of the UE context of the mobile communication device from the source mobile edge platform, wherein the pointer information at least indicates a location where the UE context of the mobile communication device locates and the location information of the source mobile edge platform, wherein the mobile edge platform connects to the source mobile edge platform and wirelessly connects to the mobile communication device, and the source mobile edge platform provides the UE context.

In another exemplary embodiment, a user equipment (UE) context migration management method applied to a mobile edge platform for managing a UE context of a mobile communication device is provided. The method comprises: receiving a first transfer request from at least one neighboring mobile edge platform corresponding to a movement of the mobile communications device; creating pointer information corresponding to the UE context in response to the first transfer request, wherein the pointer information at least indicates a location where the UE context locates and location information of the neighboring mobile edge platform; and transmitting the pointer information to the neighboring mobile edge platform, wherein the mobile edge platform connects to the neighboring mobile edge platform and wirelessly connects to the mobile communication device.

Another exemplary embodiment of a mobile edge platform server applied to a mobile edge computing network includes a mobile edge platform. The mobile edge platform comprises a communication device and a controller. The communication device is configured to perform signal transmission and reception with at least one source mobile edge platform and wireless transmission and reception with a mobile communication device. The controller is configured to receive a migration completion indication of a mobile communication device via the communication device, obtain source platform information corresponding to the mobile communication device according to the migration completion indication, and transmit a first request to the source mobile edge platform via the communication device according to the source platform information to obtain pointer information of the UE context of the mobile communication device from the source mobile edge platform via the communication device, wherein the source platform information at least comprises location information of the source mobile edge platform and the pointer information at least indicates a location where the UE context locates and the location information of the source mobile edge platform.

Another exemplary embodiment of a mobile edge platform server applied to a mobile edge computing network for managing a user equipment (UE) context of a mobile communication device includes a mobile edge platform. The mobile edge platform comprises a communication device and a controller. The communication device is configured to perform signal transmission and reception with at least one neighboring mobile edge platform and wireless transmission and reception with the mobile communication device. The controller is configured to receive a first transfer request from the neighboring mobile edge platform corresponding to a movement of the mobile communications device via the communication device, creates pointer information corresponding to the UE context in response to the first transfer request, and transmits the pointer information to the neighboring mobile edge platform, wherein the pointer information at least indicates a location where the UE context locates and location information of the neighboring mobile edge platform.

Methods disclosed above may be practiced by the devices or systems disclosed above which are hardware or firmware capable of performing particular functions and may take the form of program code embodied in a memory and/or embodied in a computer-readable storage medium/computer program product, combined with specific hardware. When the program code is loaded into and executed by an electronic device, a controller, a computer processor or a machine, the electronic device, the processor, the computer or the machine becomes an apparatus or system for practicing the disclosed method.

BRIEF DESCRIPTION OF THE DRAWINGS

The application will become more fully understood by referring to the following detailed description with reference to the accompanying drawings, wherein.

DETAILED DESCRIPTION

Figure 1:
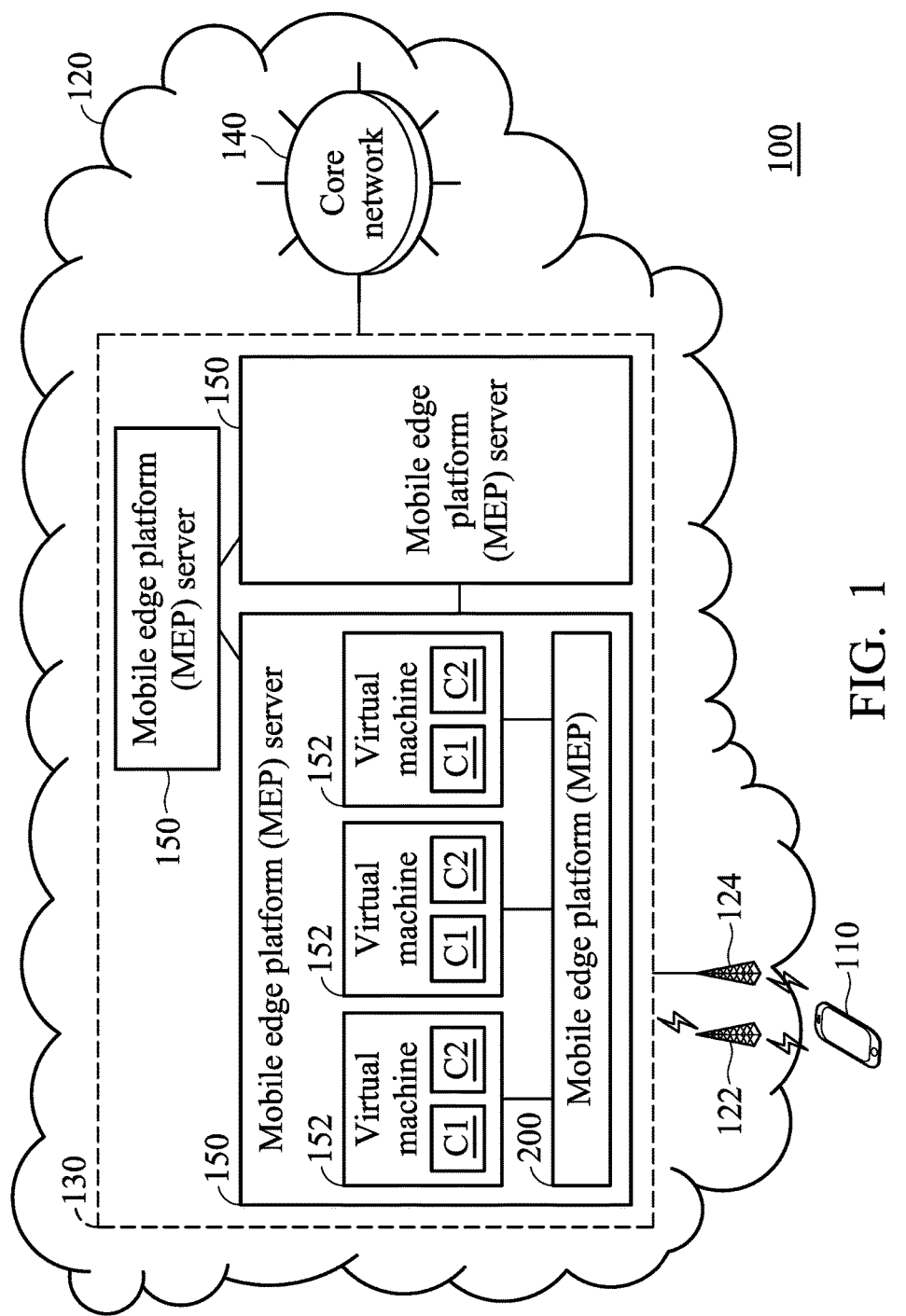
FIG. 1 is a block diagram illustrating a mobile communication environment according to an embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that the embodiments may be realized in software, hardware, firmware, or any combination thereof.

Embodiments of the application provide systems and methods for migrating user equipment contexts (UE contexts) assisted by mobile edge platforms (MEPs) based on a mobile edge computing (MEC) environment, which can only transmit UE context related pointer information while the UE continuously moves among and needs to switch the access of MEPs, such that the UE context data migration will be triggered only when the UE starts to use a service, thus effectively reducing migration time and greatly enhancing overall system performance.

FIG. 1 is a block diagram illustrating a mobile communication environment according to an embodiment of the application. In the mobile communication environment 100, a mobile communication device 110 is wirelessly connected to a base station 122 or a base station 124 of a service network 120 through the space interface to obtain the wireless access service. Generally speaking, the base stations 122 and 124 may be base stations or access stations or may be home base stations of a wideband CDMA system or evolved home base stations of a long term evolution system and the base stations 122 and 124 may be handled by a control node to provide the necessary wired/wireless transmission of the service network 120. The mobile communication device 110 is also referred to as a user equipment (referred to as UE) or a mobile station, and may support various radio access technologies. The mobile communication device 110 may be a device such as a mobile phone, a computer system, or the like. The mobile communication device 110 may at least include a communication device and a controller for performing wireless transmission with the base station 122 and the base station 124. The mobile communication device 110 may perform wired communication and/or wireless communication of voice and/or data services with the service network 120 through the base stations 122 and 124. The wireless communications between the mobile communication device 110 and the service networks 120 may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Long Term Evolution Advanced (LTE-A) technology, and others. The service network 120 includes a mobility edge computing network 130 and a core network 140. A plurality of mobile edge platform servers 150 (also referred to as mobile edge hosts) are connected to each other by a wireless or wired connection to form a mobile edge computing network 130, but the application is not limited thereto. The core network 140 is responsible for performing mobility management, network-side authentication, and interfaces with public/external networks (e.g., the Internet). For example, the core network 140 may be an Evolved Packet Core (EPC) which includes a Home Subscriber Server (HSS), Mobility Management Entity (MME), Serving Gateway (S-GW), and Packet Data Network Gateway (PDN-GW or P-GW), but the application is not limited thereto.

The mobile edge computing (MEC) network 130 is connected between the core network 140 and the mobile communications device 110 to provide a mobile edge computing environment for providing lightweight clouds at near side of the backhaul network of the base stations 122, 124 to provide cloud computing and storage capabilities for intercepting data back to the back-end core network 140 to the mobile edge platform server 150 for processing. Each mobile edge platform server 150 further includes a mobile edge platform (MEP) 200 and a plurality of virtual machines and/or containers 152. The mobile communication device 110 may be wired/wirelessly connected to the different MEPs 200 of the MEC network 130 through the base stations 122 and 124, respectively. The base stations 122 and 124 may communicate with each other via a wired connection such as the Internet, a wired LAN, etc., and/or a wireless connection such as a wireless network, a WCDMA network, a 3G network, a wireless local area network (WLAN), a Bluetooth network and the like to connect to the MEC network 130 to access each of the MEPs 200 in the MEC network 130 and perform communication and data transmission with each other. For example, the base station 122 may be connected to the MEC network 130 through a wireless connection, while the base station 124 may be connected to the MEC network 130 by an Ethernet cable and may further be connected to the Internet and then connected to the core network 140 via the Internet, but the application is not limited thereto. In this embodiment, the mobile communication device 110 may access one of the MEPs 200 in the MEC network 130 through the base station 122, and access another MEP 200 in the MEC network 130 through the base station 124. The MEP 200 runs a variety of services with low latency requirements, data analytics assistance and regional connectivity, including V2X, Virtual Reality, Augmented Reality, Instant Online games, eHealth and video analytics and so on, but the application is not limited thereto. These services running on the MEP 200 all operate in the corresponding virtual machines or containers 152 of the MEP server 150. To simplify the description, in the following embodiments, the virtual machines and/or containers 152 are collectively referred to as a virtual machine 152. Each virtual machine 152 includes at least one UE context corresponding to one or more specific services of users of one or more mobile communication devices 110. For example, the first UE context C1 and the second UE context C2 may be included in the virtual machine 152, and the first UE context C1 and the second UE context C2 may correspond to different uses of the same service, the same user corresponding to different services, or different users corresponding to different services. The UE context is contextual data for each user using the service. For example, in one embodiment, the UE context may be a file in a format such as JSON, XML, or YAML, but the application is not limited thereto.

Figure 2:
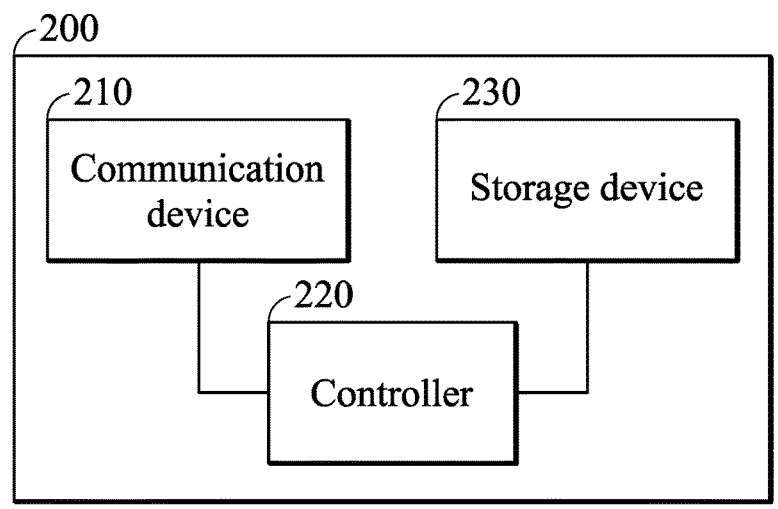
FIG. 2 is a schematic diagram of a hardware structure of a mobile edge platform according to an embodiment of the application.

FIG. 2 is a schematic diagram of a hardware structure of a mobile edge platform according to an embodiment of the application. As shown in FIG. 2, the mobile edge platform 200 includes at least a communication device 210, a controller 220, and a storage device 230.

The communication device 210 is configured to receive information about the mobile communication device 110 and other MEP 200. For example, the communication device 210 may receive a signal from the current connected network and transmit the signal to the current connected network. The communication device 210 may include a wired communication module that may be coupled (electrically connected) to one or more wired networks and may allow utilization of a wired network to communicate with one or more additional devices, computer servers, and/or network nodes, such as base stations or the like. The communication device 210 may further include a wireless module, may be coupled (electrically connected) to one or more antennas (not shown), and may allow a wireless network to communicate with one or more additional devices, a computer server and/or network nodes (such as base stations, etc.). The mobile edge platform 200 may support various communication protocols such as CDMA, GSM, EDGE, HSDPA, Wi-Fi (eg IEEE 802.11a/b/g/n), Bluetooth and Wi-MAX, and protocols such as email, instant messaging (IM), and smart messaging services and other RATs standards, but the application is not limited thereto. Specifically, the communication device 210 is coupled (electrically connected) to the controller 220 and bidirectionally links with communication devices having the same communication channel and protocol so as to receive external messages such as messages sent by each mobile communication device 110 and the MEP 200 and then output received messages to the controller 220, and broadcasts the message output by the controller 220 to the outside through the communication device 210.

The controller 220 may be a general-purpose processor, a Micro Control Unit (MCU), a Digital Signal Processor (DSP), or the like, which includes various circuits for providing the functions of data processing and computing, but the application is not limited thereto. The controller 220 which is coupled (electrically connected) to the communication device 210 and the storage device 230, may be used to load and execute a series of instructions and/or program codes from the storage device 230 to control the operations of the communication device 210 and the storage device 230 to perform the UE context migration management methods of the application, the details of which will be described more in the following paragraphs.

The storage device 230 may be a non-volatile storage medium (e.g., Read-Only Memory (ROM), Flash memory, magnetic tape, hard disk, or optical disc), or a volatile storage medium (e.g., Random Access Memory (RAM)), or any combination thereof for storing data, such as intermediate data generated during the calculation process and the execution result information and so on. The storage device 230 may also store instruction sets and/or program code modules that can be executed by the controller 220, but the application is not limited thereto. Generally speaking, program code modules contain routines, programs, objects, components, and so on. The storage device 230 may further store various items of data required for the operation, such as UE contexts, difference data, and so on, but the application is not limited thereto.

As will be comprehended by persons skilled in the art, the circuits in the controller 220 will typically comprise transistors that are configured in such a way as to control the operation of the circuitry in accordance with the functions and operations described herein. As will be further comprehended, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems and those skilled in the art will understand that the present application is not limited thereto.

Although they are not shown, the mobile communication device 110 in FIG. 1 may also comprise a communication device and a controller. The communication device is configured to provide wireless transmission and reception functions to communication between each of the base stations 122 and 124 and each of the MEPs 200 in the mobile communication environment 100, and the controller is used to control the operation of the communication devices. The operations of the communication device and the controller of the mobile communication device 110 are similar to that of the embodiment shown in FIG. 2, and thus details are omitted here for brevity.

Figure 3:
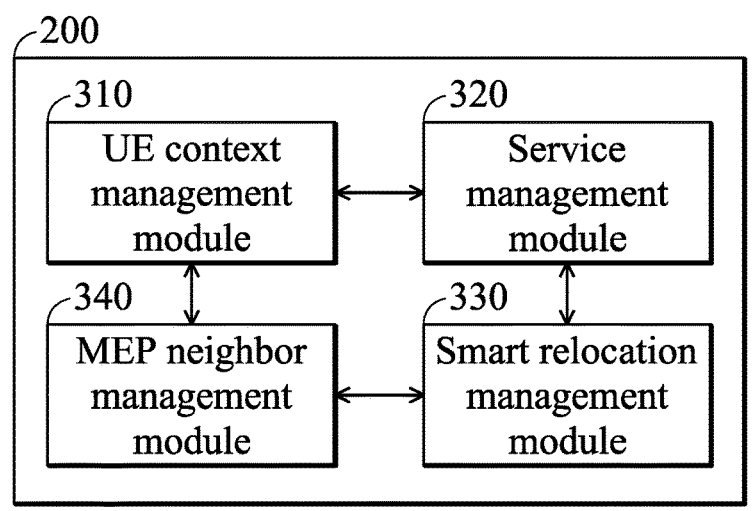
FIG. 3 is a schematic diagram of a functional module architecture of the mobile edge platform according to an embodiment of the application.

FIG. 3 is a schematic diagram of functional module architecture of the MEP 200 according to an embodiment of the application. The functional module architecture of the MEP 200 includes a UE context management module 310, a service management module 320, a smart relocation management module 330, and an MEP neighbor management module 340. The UE context management module 310, the service management module 320, the smart relocation management module 330, and the MEP neighbor management module 340 can be stored in the storage device 230 (e.g., memory) of the MEP 200, and can be loaded and executed at an appropriate timing by the controller 220 of the MEP 200 to perform the UE context migration management method applied to a MEP of the present application. For example, the controller 220 may perform the UE context migration management method applied to the MEP 200 of the present application by controlling the operations of the UE context management module 310, the service management module 320, the smart relocation management module 330 and the MEP neighbor management module 340.

The UE context management module 310 mainly carries out the importation, retrieval, deletion and termination of the UE contexts of one or more users on the virtual machine 152 through exclusive application programing interface (API). In some embodiments, the UE context management module 310 can also generate a profile of a specific UE context to record related information such as the source of the UE context and other information. The UE context management module 310 may generate pointer information indicating a corresponding position of each UE context on the virtual machine 152. In other words, the UE context management module 310 can obtain a storage location where a UE context is located by using the pointer information of the UE context, and retrieve the UE context from this storage location.

The service management module 320 carries out status inquiry and activation operations on various services on the virtual machine 152 through the dedicated API. The smart relocation management module 330 is responsible for communicating with other MEP 200 related to UE context migration and receiving migration events triggered at the mobile communication device 110. For example, the above migration events may include time indicators for the mobile communication device 110 at which a migration starts and at which the migration has completed. The MEP neighbor management module 340 can communicate with neighboring MEP 200 (periodically communication within a predetermined time period or communication at the time of a specific event triggered) to collect information of the neighboring MEP 200 and manage and record information of the neighboring MEP 200, so as to know which UE contexts of the neighboring MEP are to be migrated when a UE context migration procedure is needed when the process of migrating the UE context needs to be performed. The MEP 200 may have multiple respective virtual machines 152, while the various services running on the MEP 200 are operated on the corresponding virtual machines 152 of the MEP 200. The respective virtual machine 152 frameworks should at least contain multiple UE contexts. The above-mentioned UE context not only accommodates the access of corresponding services in the virtual machine 152, but also accommodates direct UE context access by the MEP 200 through the API, thereby responding to the user's demand for the MEP switching and service migration when the user is moving.

More particularly, the controller 220 may generate related pointer information for corresponding UE contexts of the service that needs to be migrated and access the corresponding UE contexts of the service that needs to be migrated through the UE context management module 310, perform a status inquiry and activation on a designated service within the virtual machine 152 through the service management module 320, carry out relevant UE context migration communication with other MEP 200 and receive the moving events triggered by the mobile communication devices 110 through the smart relocation management module 330, and obtain source platform information of a source MEP and neighboring platform information of the neighboring MEPs related to the service migration through the MEP neighbor management module 340, so as to perform a migration operation of the UE context in response to the MEP switching and the service migration requirement caused by the user movement to move UE contexts of all the services with migration needs to corresponding MEP. The details of which will be described later. The source MEP represents the MEP where the user first accesses and has used the service thereon before starting a movement, the neighboring MEP represents the middle MEP or the target MEP during the movement, and the target MEP indicates the MEP where the user first accesses and starts using the service after the movement.

Although they are not shown, the MEP 200 may further comprise other functional units, such as an Input/Output (I/O) device (e.g., physical button, keyboard, etc.), a display device, an audio device or the like, and the application is not limited thereto.

It should be understood that each of the elements or modules in the present embodiments may be a device having a corresponding function, which can have the appropriate hardware circuits or elements to perform the corresponding function, however, the device is not limited to be entity device, which can also be a virtual device having program and software with respective functions or a device having capabilities for processing and running the program and software. The manner of operations of the respective elements can further refer to the following description of the methods. In one embodiment, the UE context management module 310, the service management module 320, the smart relocation management module 330, and the MEP neighbor management module 340 may be implemented as a chip, a circuit board, or a circuit, and the controller 120 may control the operations of the UE context management module 310, the service management module 320, the smart relocation management module 330 and the MEP neighbor management module 340 to perform the UE context migration management method applied to the MEP of the present application, which will be discussed further in the following paragraphs.

Figure 4:
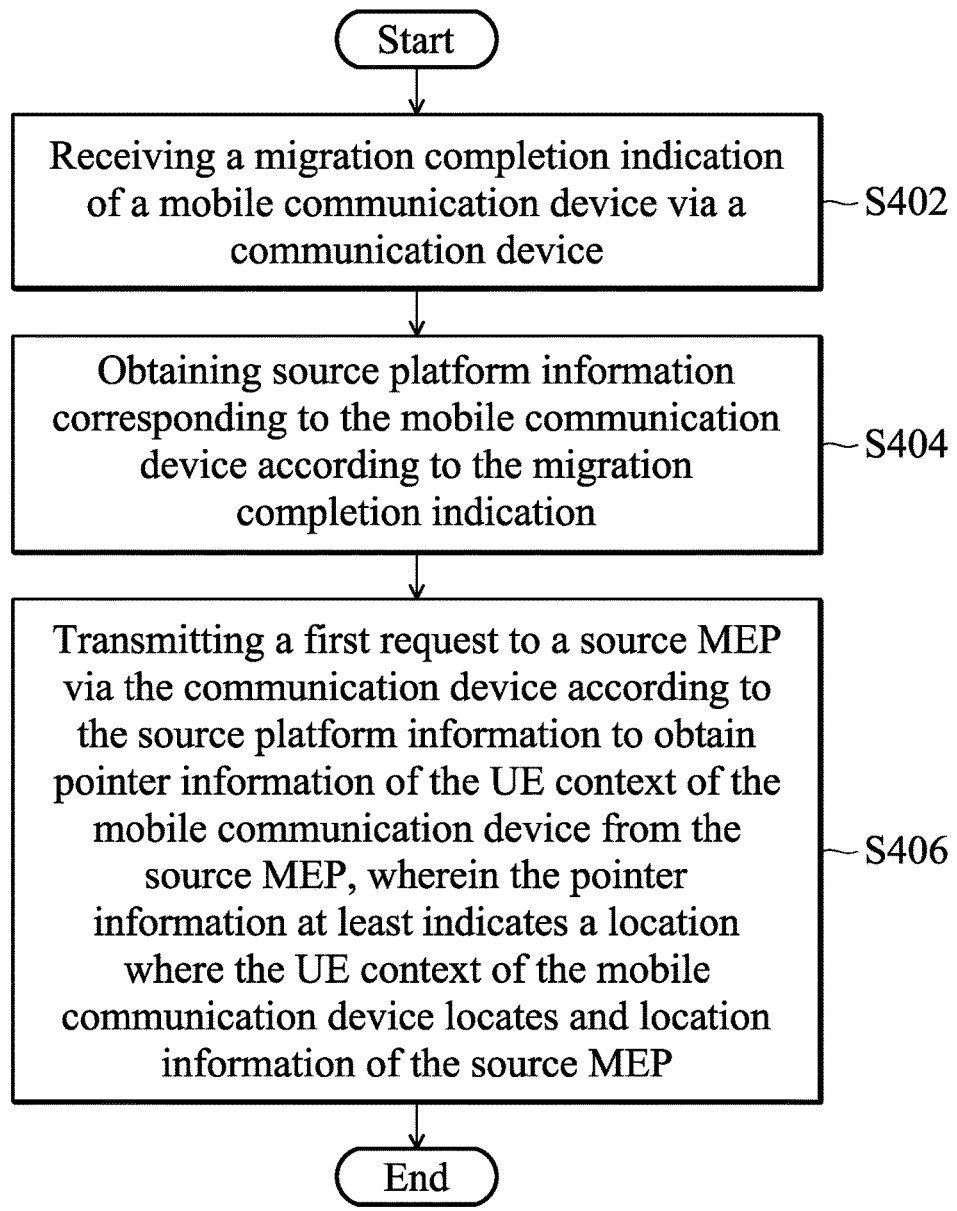
FIG. 4 is a flowchart of an UE context migration management method according to an embodiment of the application.

FIG. 4 is a flowchart of an UE context migration management method applied to a MEP according to an embodiment of the application. Please refer together with FIG. 1, FIG. 2, FIG. 3 and FIG. 4. The UE context migration management method applied to the MEP of the application may be applied to any MEP in a mobile edge computing network, such as the MEP 200 as shown in FIG. 2 and performed by the controller 220 of the MEP 200. In this embodiment, it is assumed that the mobile communication device 110 can be connected to a source MEP MEP_A and the MEP 200 through the base station 122, wherein the source MEP MEP_A provides a first service to the mobile communication device 110 and stores the UE context corresponding to the first service for the user of the mobile communication device 110. Due to the movement of the mobile device 110, it crosses to the MEP 200 during the movement, resulting in a MEP switching needs.

First, when the mobile communication device 110 moves from the source MEP MEP_A to the signal coverage of the MEP 200, in step S402, the controller 220 of the MEP 200 receives migration completion indication information (UE Migration Complete Indication) of the mobile communication device 110 via the communication device 210. The migration completion indication of the mobile communication device 110 is used to indicate that the mobile communication device 110 has moved to the signal coverage of the base station of the MEP 200.

Next, in step S404, the controller 220 of the MEP 200 obtains a source platform information corresponding to the mobile communication device 100 according to the migration completion indication, wherein the source platform information at least includes location information of the source MEP. For example, the MEP neighbor management module 340 of the MEP 200 may communicate with the MEP neighbor management modules of other MEPs in advance to obtain and store all the source platform information of each mobile communication device 110 within its signal coverage, and the controller 220 may obtain the source platform information of the corresponding mobile communication device 110 by retrieving the source platform information through the MEP neighbor management module 340. In this embodiment, since the mobile communication device 110 moves from the source MEP MEP_A to the MEP 200, the source MEP in the source platform information is denoted as MEP_A.

After obtaining the source platform information corresponding to the mobile communication device 110, in step S406, the controller 220 of the MEP 200 transmits a first request to the source MEP via the communication device 210 according to the source platform information to obtain pointer information of the above UE context for the mobile communication device 100, wherein the pointer information at least indicates the location of the UE context that needs to be migrated and the location information of the source MEP. In one embodiment, the controller 220 may confirm, according to the location information of the source MEP in the source platform information, which MEP the UE context that needs to be migrated for the mobile device 110 locates and thus it may transmit the first request to request the source MEP to transfer the pointer information of the UE context for the mobile communication device 110. When the source MEP (MEP_A) receives the transfer request from the MEP 200 via its communication device, the controller of the source MEP sets up/creates the pointer information of the UE context via the UE context management module, wherein the pointer information of the UE context at least indicates the location where the UE context locates and the location information of the source MEP. In other words, with the pointer information, the location of the source MEP and the location of the MEP on which the UE context is stored can be obtained. Thereafter, the pointer information is transmitted to the MEP 200 through the communication device.

When the MEP 200 obtains the pointer information, controller 220 may determine whether to request the source MEP to perform the aforementioned UE context migration based on subsequent moving actions of the mobile communication device 110. For example, subsequent moving actions may include "not using services and moving to next neighboring MEP", "stop moving and start using a service" or the like, but the application is not limited thereto. In some embodiments, when the subsequent moving action of the mobile communication device 110 is determined as "not using services and moving to next neighboring MEP", the MEP200 can be regarded as an intermediate MEP, and thus only the migration of the pointer information with next neighboring MEP is needed to be performed without needing to perform the above-mentioned UE context migration. The controller 200 may, in response to receiving a pointer transfer request from a next neighboring MEP (e.g., MEP_C) corresponding to a movement of the mobile communication device 110 via the communication device 210, transmit the pointer information to the neighboring MEP via the communication device 210.

In some embodiments, when the subsequent moving action of the mobile communication device 110 is determined as "stop moving and starting using a service", the MEP 200 can be regarded as the target MEP, thereby needing to perform the UE context migration. The controller 220 may receive a request for enabling the service from the mobile communication device 110 and then transmit a second request including the pointer information to the source MEP in response to the request for enabling the service in order to request the source MEP to perform a migration operation of the UE context. When the source MEP receives the second request, it may perform the migration operation of the UE context according to the pointer information in the request to retrieve the UE context from the storage location indicated by the pointer information and transmit the UE context to the MEP 200. The MEP 200 may then update the received UE context to a virtual machine 152 of the corresponding service on the MEP 200 in order to migrate the original services to the MEP200 to continue execution.

Figure 5:
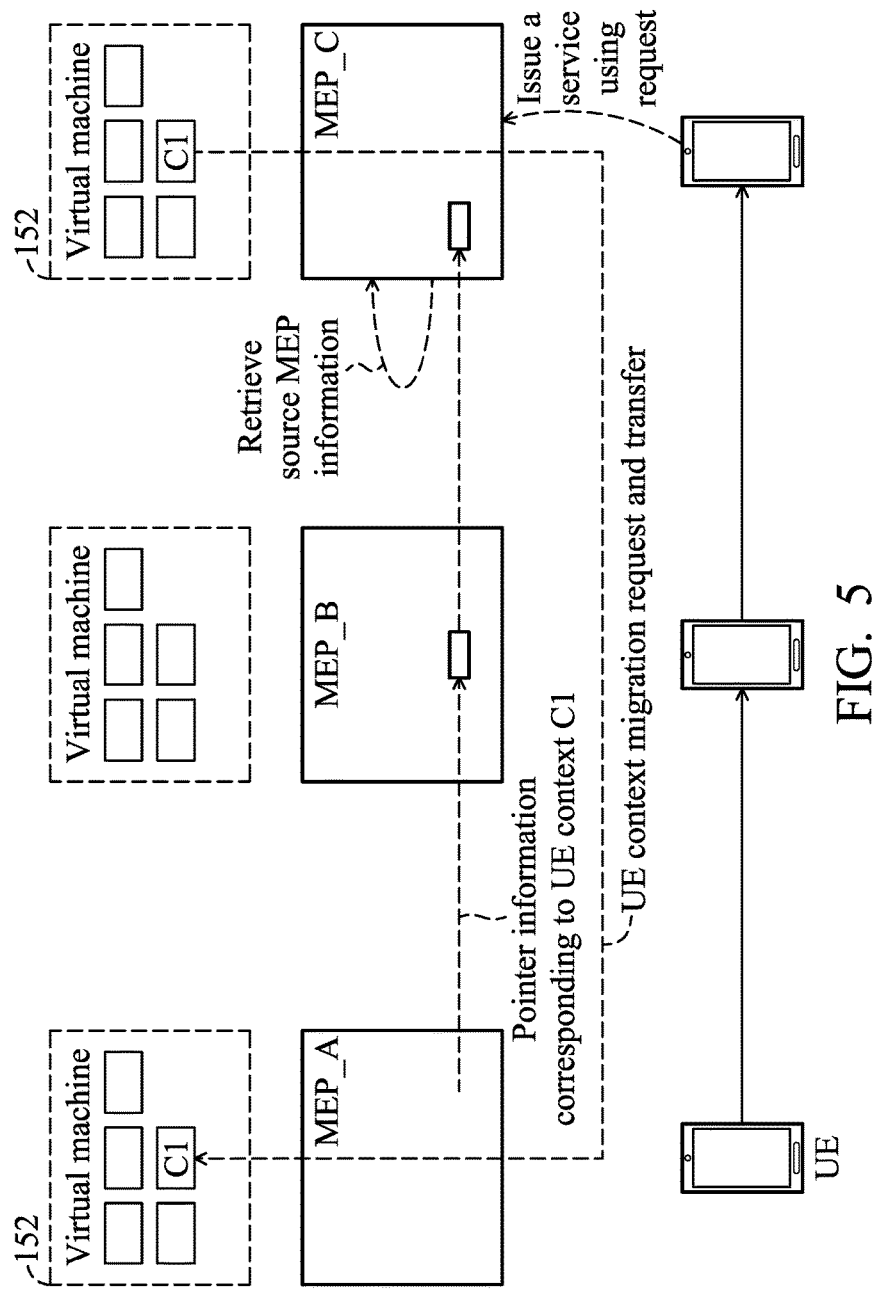
FIG. 5 is a schematic diagram illustrating an exemplary embodiment of UE context migration management between the mobile edge platforms.

Referring to FIG. 5, FIG. 5 is a schematic diagram illustrating an exemplary embodiment of UE context migration management between the MEPs. As shown in FIG. 5, the mobile communication device UE starts a movement from the source MEP MEP_A and moves to the destination MEP MEP_C through the intermediate MEP MEP_C, wherein the source MEP MEP_A provides a first service SRA (e.g., a V2X or AR application service) that can be executed by the mobile communication device UE, and stores a UE context C1 corresponding to the first service SRA of the mobile communication device UE.

When the mobile communication device UE moves from the source MEP MEP_A to the signal coverage of the mobile edge platform MEP_B, the mobile edge platform MEP_B first obtains from the source MEP MEP_A pointer information indicating the location of the UE context C1 and the location information of the mobile edge platform MEP_A.

Since the mobile communication device UE does not enable the first service SRA on the mobile edge platform MEP_B, the mobile edge platform MEP_B does not need to perform the migration operation on the UE context C1.

Then, when the mobile communication device UE continues to move from the mobile edge platform MEP_B to the signal coverage of the mobile edge platform MEP_C, the mobile edge platform MEP_C first requests the mobile edge platform MEP_B to migrate the pointer information P1 and obtains the pointer information P1. Since the mobile communication device UE has enabled the first service SRA when it is on the mobile edge platform MEP_C, the mobile edge platform MEP_C receives a request for enabling the first service SRA from the mobile communication device UE and then transmits a second request including the pointer information P1 to the mobile edge platform MEP_A according to the request for enabling the first service SRA to request the source MEP MEP_A to perform a migration operation of the UE context C1. After receiving the second request of the mobile edge platform MEP_C, the mobile edge platform MEP_A may retrieve the UE context C1 from data marked in the pointer information P1 such as a service identifier and a storage location according to the pointer information P1 in the request and transmits the UE context C1 to the mobile edge platform MEP_C. The mobile edge platform MEP_C then updates the received UE context C1 to a virtual machine 152 corresponding to the service SRA on the mobile edge platform MEP_C to migrate the service SRA to the mobile edge platform MEP_C to continue execution.

In one embodiment, when the MEP 200 is an intermediate MEP (e.g., the MEP_B as shown in FIG. 5), the controller 220 may receive, through the mobile device 210, a pointer transfer request from a next neighboring MEP (e.g., the MEP_C as shown in FIG. 5) corresponding to a movement of the mobile communication device and transmit the pointer information to the above neighboring MEP in response to the pointer transfer request. In another embodiment, when the MEP 200 is a target MEP (e.g., the MEP_C as shown in FIG. 5), the controller 220 may transmit a deleting request to the source MEP (e.g., the MEP_A as shown in FIG. 5) via the communication device 210 after the UE context C1 is obtained to request the source MEP to delete the UE context C1 to save the storage space of the source MEP. In another embodiment, when the MEP 200 is a source MEP (e.g., the MEP_A as shown in FIG. 5), the controller 220 may transmit the UE context C1 to the target MEP (e.g., the MEP_C as shown in FIG. 5) via the communication device 210, then receives a deleting request from the target MEP via the communication device 210 and deletes the UE context in response to the deleting request to save its storage space. The target MEP may send the deleting request to the MEP 200 after completing the updating of the new UE context to the corresponding service.

In some embodiments, the MEP 200 may further obtain neighboring platform information including the location information of a plurality of neighboring MEPs after obtaining the above pointer information and then actively transmits the pointer information to the plurality of neighboring MEPs according to the neighboring platform information. In other words, the MEP 200 may automatically forward the pointer information to all the related neighboring MEPs in advance after receiving the pointer information.

Thus, when the UE moves continuously and switches to access different MEPs, the MEP will be responsible for managing and transmitting the UE context. During the movement, if the UE temporarily does not use the UE context of a service, each MEP only transfers the pointer information at least containing the location information of the source MEP (including the location where the UE context locates) in a small quality to the next MEP until the UE starts using the service and triggers the migration operation of the UE context. This way, the purpose of targeting only the UE context for migration can be achieved, thus effectively solving the current technical problem of "If the user continues to move and switch to access different MEPs, large amount of migrations leading to a waste of network resources and transmission time may result", effectively reducing the amount of data being migrated and enabling services needed to quickly migrate and in turn reducing migration time and substantially improving the overall system performance.

For explanation, specific UE context migration management methods applied to the MEP are illustrated as actual implementation examples in the following embodiments, and those skilled in the art will understand that the present application is not limited thereto.

Figure 6A:
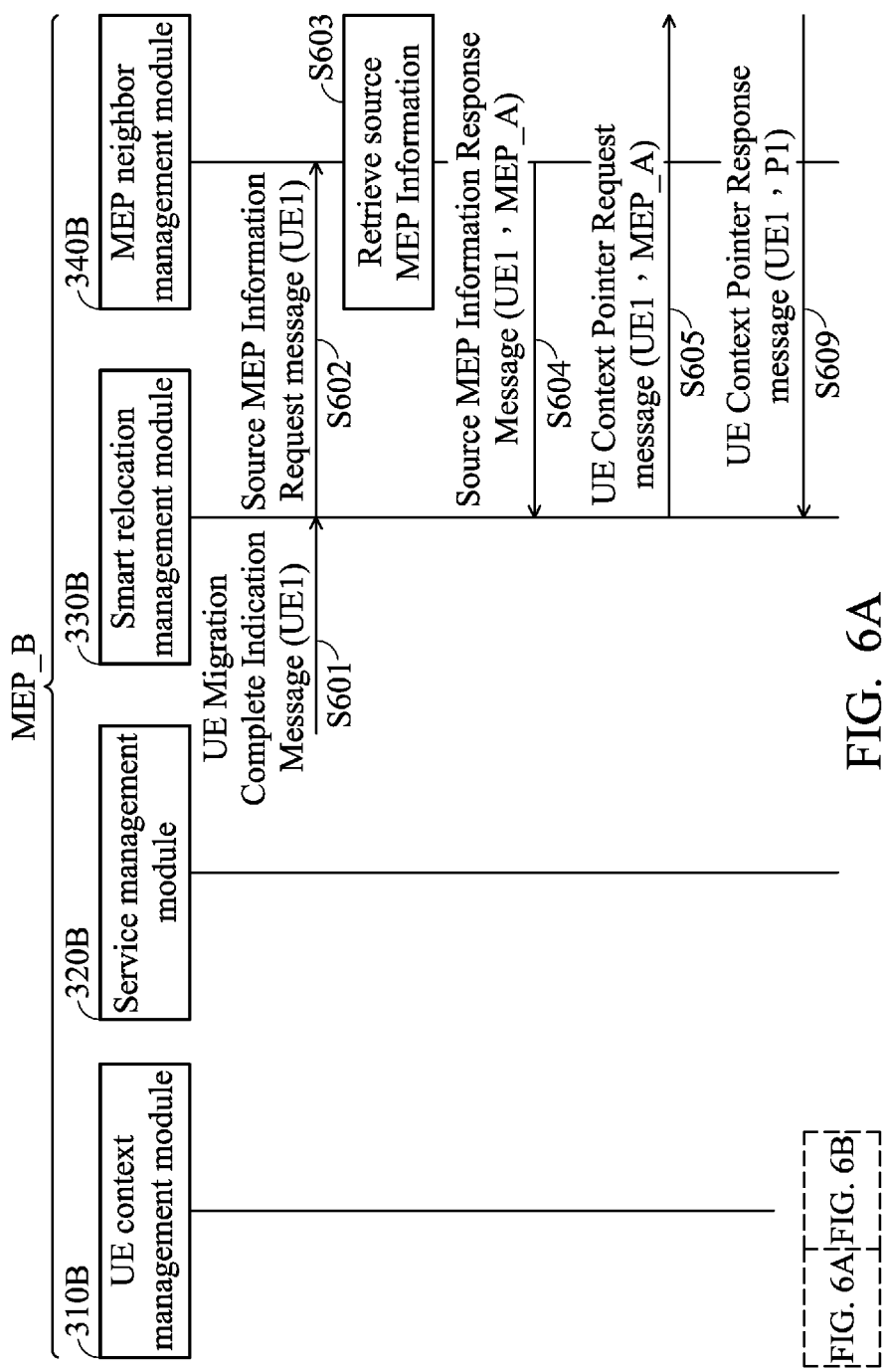
FIGS. 6A~6B show a message sequence chart illustrating a pointer migration operation of UE contexts when the mobile communication device starts a migration according to an embodiment of the application.
Figure 6B:
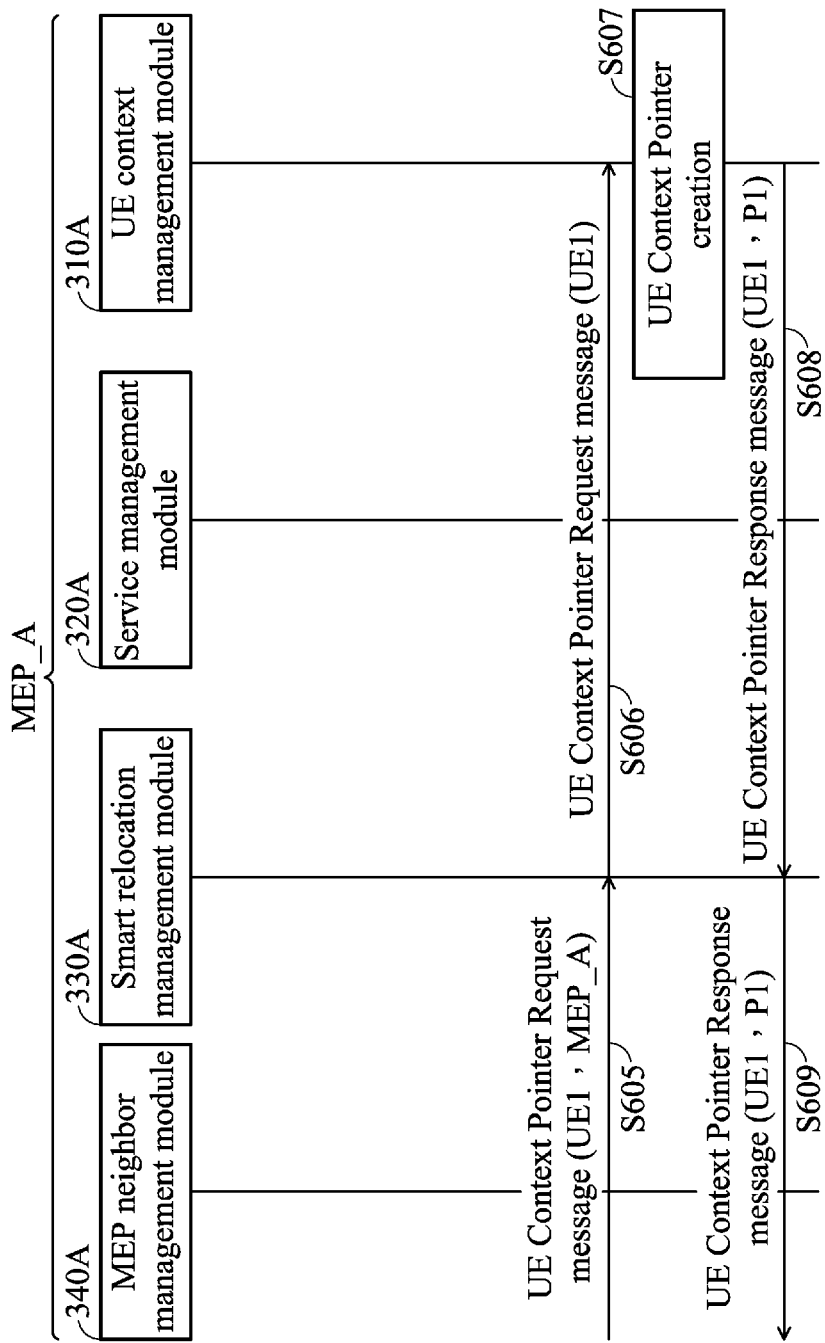

FIGS. 6A~6B show a message sequence chart illustrating the pointer migration operation of UE contexts when the mobile communication device UE1 (e.g., the mobile communication device 110 of FIG. 1) starts a migration according to an embodiment of the application, wherein FIG. 6A shows a message sequence chart illustrating the corresponding pointer migration operation of UE contexts at the mobile edge platform MEP_B while FIG. 6B shows a message sequence chart illustrating the corresponding pointer migration operation of UE contexts at the source MEP MEP_A according to another embodiment. In this embodiment, consider that the mobile communication device UE1 moves from the source MEP MEP_A to the mobile edge platform MEP_B, wherein the source MEP MEP_A provides a first service SRA (for example, V2X or AR application service) and stores the UE context C1 corresponding to the first service SRA of the mobile communication device UE1.

In this embodiment, the MEPs MEP_A and MEP_B respectively include the architecture as same as those shown in FIG. 2 and FIG. 3. The mobile edge platform MEP_A includes a UE context management module 310A, a service management module 320A, a smart relocation management module 330A, and a MEP neighbor management module 340A. The mobile edge platform MEP_B includes a UE context management module 310B, a service management module 320B, a smart relocation management module 330B, and a MEP neighbor management module 340B. The UE context C1 corresponding to the first service SRA of the mobile communication device UE1 is stored in a location X of the virtual machine VMA in the mobile edge platform MEP_A while it is stored in the virtual machine VMB in the mobile edge platform MEP_B.

As shown in FIG. 6A, when the mobile communication device UE1 moves into the signal coverage of the mobile edge platform MEP_B, the smart relocation management module 330B on the mobile edge platform MEP_B receives a UE context migration completion indication message (UE Context Migration Complete Indication message) including at least one UE identifier (UE ID) (S601). In this embodiment, the UE identifier is UE1. For example, the UE context migration completion indication message may be generated due to a handover request or a signal variation. The smart relocation management module 330B sends a Source MEP Information Request message including the above UE identifier to the MEP neighbor management module 340C as shown in FIG. 6A (S602). After receiving the Source MEP Information Request message, as shown in FIG. 6A, the MEP neighbor management module 340B performs a source MEP Information extraction for extracting the source MEP information (S603). Since the MEP neighbor management module 340B can collect the information of all the peripheral MEPs by communicating information with the corresponding MEP neighbor management module of each neighboring MEP, it is possible to obtain the information of source MEP identifier (MEP IP) corresponding to the UE identifier (UE1). The source MEP identifier indicates from which MEP the UE whose UE identifier is UE1 starts to move. In this embodiment, since the source MEP is MEP_A, the source MEP identifier is MEP_A.

After obtaining the source MEP identifier (MEP_A) corresponding to the UE identifier (UE1), as shown in FIG. 6A, the MEP neighbor management module 340B sends to the smart relocation management module 330B a Source MEP Information Response message including at least the UE identifier (UE1) and the source MEP identifier (MEP_A) (S604). In this embodiment, the source MEP identifier is MEP_A. That is, the mobile edge platform MEP_B may determine MEP_A to be the source MEP according to the source MEP identifier, and the mobile edge platform MEP_B may inform the source MEP MEP_A information regarding the corresponding UE context for which UE (i.e., UE1) needs to be migrated through the UE identifier and the service identifier.

Through the Source MEP Information Response message, the smart relocation management module 330B on the mobile edge platform MEP_B knows that the source MEP is MEP_A and thus respectively sends a UE Context Pointer Request message including at least the UE identifier (UE1) and the source MEP identifier (MEP_A) to the smart relocation management module 330A corresponding to the source mobile edge platform MEP_A (S605).

In response to the UE Context Pointer Request message, as shown in FIG. 6B, the smart relocation management module 330A on the mobile edge platform MEP_A sends a UE Context Pointer Request message including at least the UE identifier (UE1) and the source MEP identifier (MEP_A) to the UE context management module 310A (S606).

In response thereto, as shown in FIG. 6B, the UE context management module 310A performs a procedure for creating a UE context pointer and generates a UE context pointer information based on the UE identifier (UE1) (S607). In this embodiment, it is assumed that the UE context pointer information corresponding to the UE identifier (UE1) is P1. That is, P1 indicates that the source MEP is MEP_A and points to the location X on which the UE context of UE1 locates. After the UE context pointer information is generated, the UE context management module 310A sends back to the smart relocation management module 330A a UE Context Pointer Response message at least including the UE identifier (UE1) and the respective pointer information (P1) to the smart relocation management module 330A (S617). The smart relocation management module 330A further sends back to the smart relocation management module 330B of the mobile edge platform MEP_B the UE Context Pointer Response message at least including the UE identifier (UE1) and the respective pointer information (P1) (S609) to complete the handover of the UE context among the MEPs once. The above message sequence from FIG. 6A to FIG. 6B may be repeatedly executed each time a UE needs to move continuously across the MEPs and has not used the service.

Figure 7A:
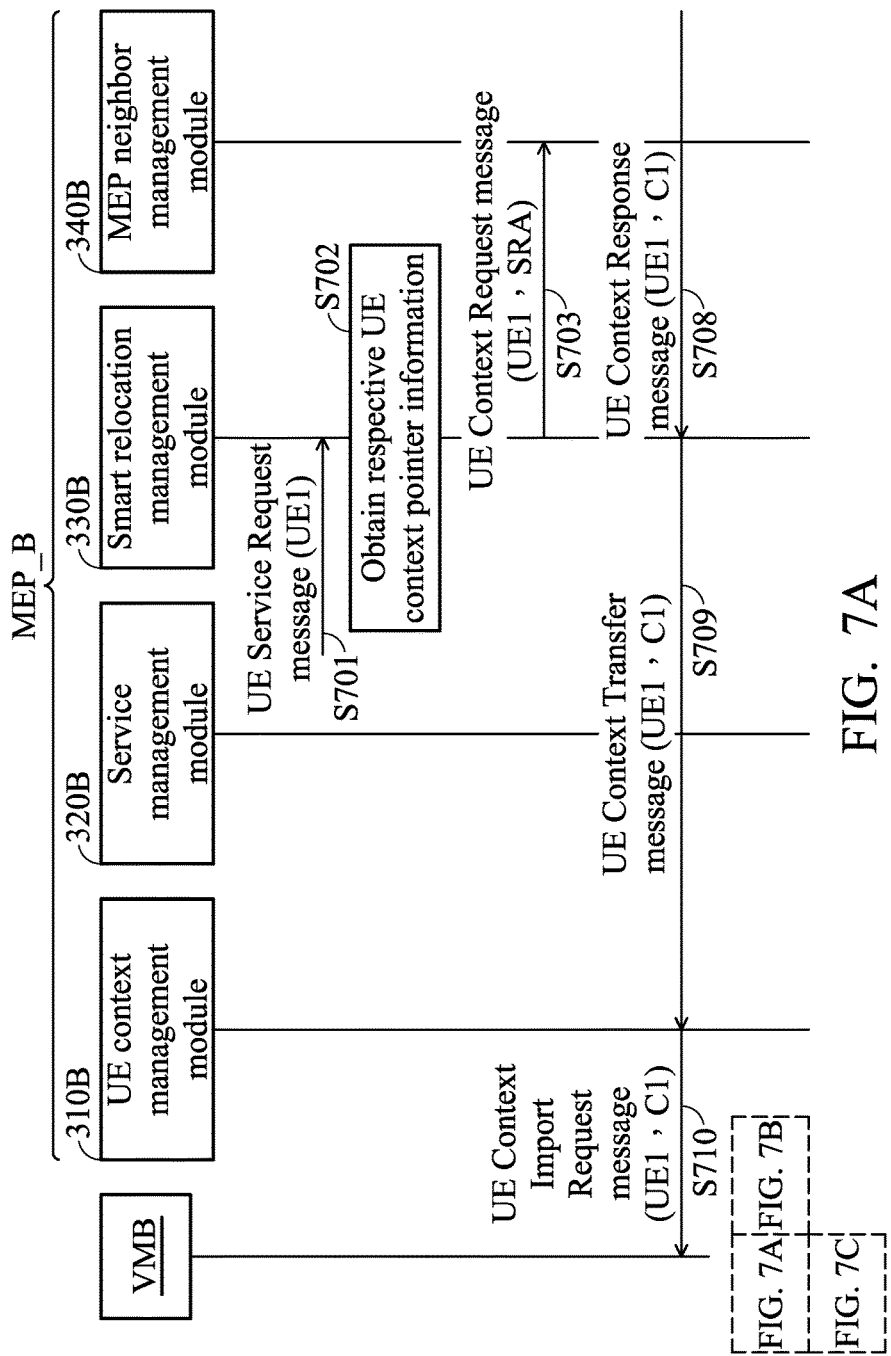
FIGS. 7A~7C show a message sequence chart illustrating the UE context migration when the mobile communication device needs to start using the service after the continuous movement of the mobile communication device according to an embodiment of the application.
Figure 7B:
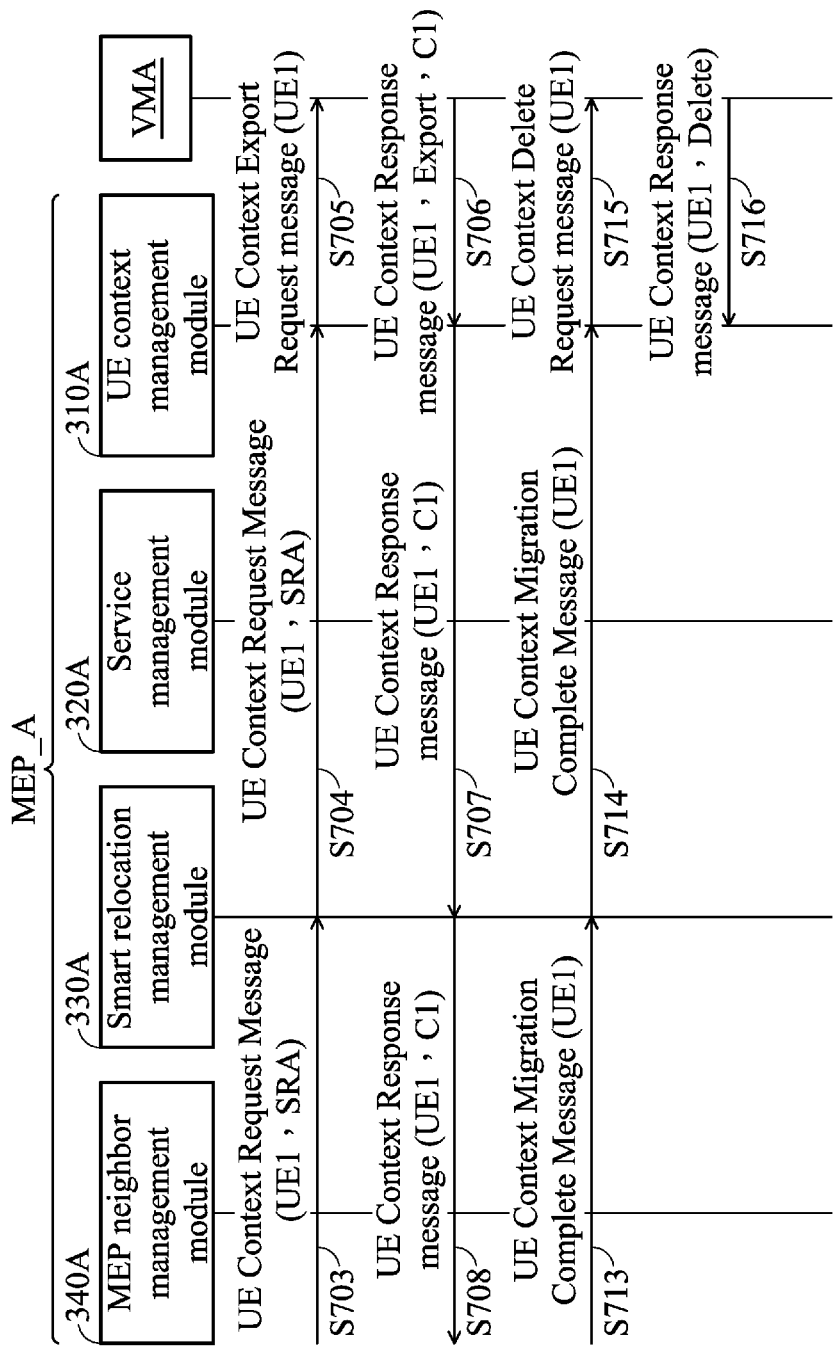
Figure 7C:
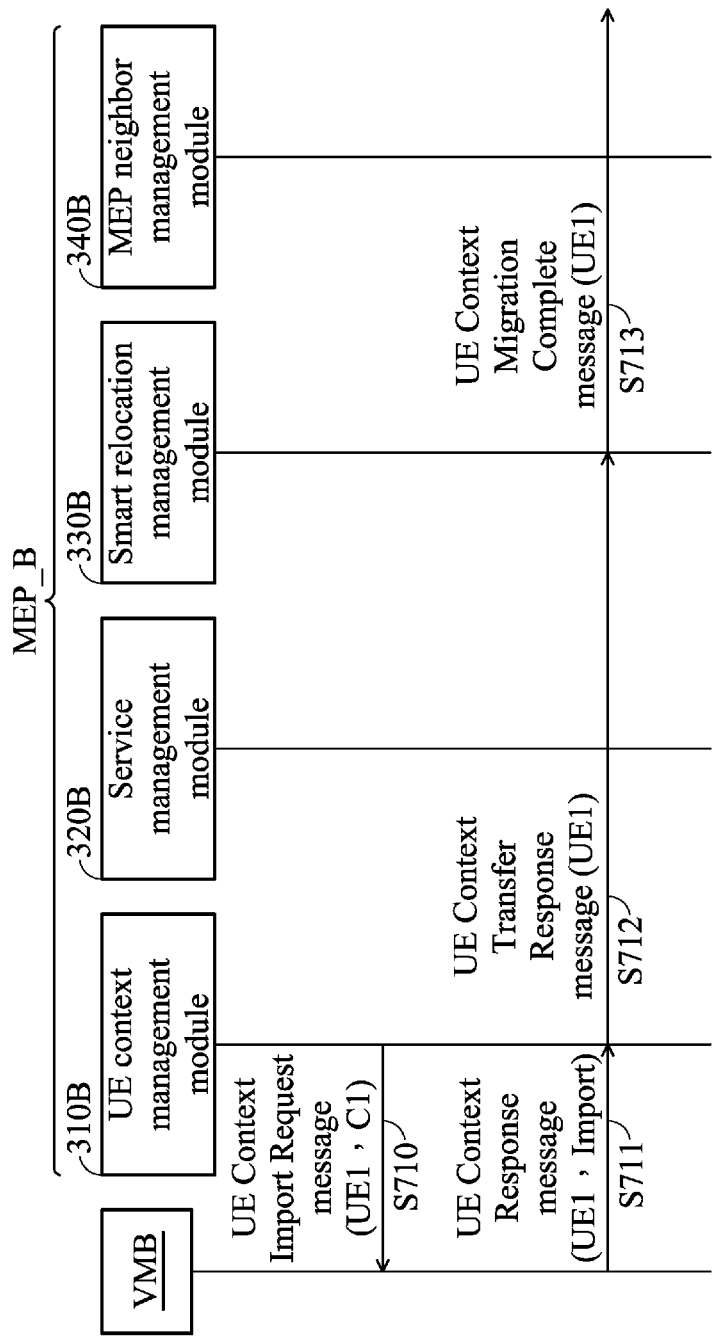

Please refer to FIGS. 7A~7C. FIGS. 7A~7C show a message sequence chart illustrating the migration of UE contexts when the mobile communication device UE1 (e.g., the mobile communication device 110 of FIG. 1) needs to start using the service after a continuously moving of the mobile communication device UE1 according to another embodiment of the application. FIGS. 7A and 7C are corresponding message sequence chart illustrating the migration operation of the UE contexts at the target MEP MEP_B end while FIG. 7B is a corresponding message sequence chart illustrating the migration operation of the UE contexts at the source MEP MEP_A end. In this embodiment, consider that the mobile communication device UE1 moves from the source MEP MEP_A to the target MEP MEP_B, and thus the target MEP MEP_B first obtains the pointer information P1 according to the message sequence chart as shown in FIGS. 6A~6B. In this embodiment, the MEPs MEP_A and MEP_B respectively include the architecture as same as those shown in FIG. 2 and FIG. 3. The mobile edge platform MEP_A includes a UE context management module 310A, a service management module 320A, a smart relocation management module 330A, and a MEP neighbor management module 340A. The mobile edge platform MEP_B includes a UE context management module 310B, a service management module 320B, a smart relocation management module 330B, and a MEP neighbor management module 340B. The UE context corresponding to the first service SRA (e.g., a V2X or AR application service) of the mobile communication device UE1 is stored in a location X of the virtual machine VMA in the mobile edge platform MEP_A while it is stored in the virtual machine VMB in the mobile edge platform MEP_B.

As shown in FIG. 7A, when the mobile communication device UE1 starts to use the service on the target MEP MEP_B, the smart relocation management module 330B on the target MEP MEP_B receives a UE Service Request message including at least the UE identification (UE_ID) (S701). In this embodiment, the UE identifier is UE1. The smart relocation management module 330B then retrieves the information in the UE context pointer P1 corresponding to the UE1 (S702).

The smart relocation management module 330B on the mobile edge platform MEP_B sends a UE Context request message (UE Context Request Message) including at least the UE identifier (UE1) and the service identifier (MEP_Service_ID) to the smart relocation management module 330A corresponding to the source MEP MEP_A (S703). In this embodiment, the UE identifier is UE1 and the service identifier is SRA. That is, the target MEP MEP_B may determine the source MEP as MEP_A by using the source MEP identifier in the pointer information P1, and the target MEP MEP_B may inform the source MEP MEP_A information regarding the corresponding UE context for which UE (i.e., UE1) of which service (i.e., SRA) needs to be migrated through the UE identifier and the service identifier in the UE Context Request message.

As shown in FIG. 7B, on the source MEP MEP_A, the smart relocation management module 330A forwards the above UE Request message including at least the UE identifier (UE1) and the service identifier (SRA) to the UE context management module 310A (S704). Correspondingly, the UE context management module 310A sends a UE Context Export Request message including at least the UE identifier (UE1) to the virtual machine VMA where the UE context being requested is located through the API (S705).

In response to the UE Context Export Request message, the virtual machine VMA obtains a UE context C1 corresponding to the UE identifier according to the UE identifier (UE1), and sends a UE Context Response message including at least the UE identifier (UE1), a data type of "Export", and the obtained UE context C1 to the UE context management module 310A (S706). The UE context management module 310A then sends a UE Context Response message including at least the UE identifier (UE1) and the obtained UE context C1 to the smart relocation management module 330A (S707) such that the smart relocation management module 330A correspondingly sends the above UE Context Response message including at least the UE identifier (UE1) and the obtained UE context C1 to the smart relocation management module 330B of the target MEP MEP_B (S708).

On the target MEP MEP_B, as shown in FIG. 7A, after receiving the above-mentioned UE Context Response message, the smart relocation management module 330B sends a UE Context Transfer message at least including the UE identifier (UE1) and the obtained UE context C1 to the UE context management module 310B (S709).

After receiving the above-mentioned UE Context Transfer message, the UE context management module 310B sends a UE context Import Request message including the UE1 and the UE context C1 to be updated to the virtual machine VMB to update the UE context C1 into the corresponding UE context of the virtual machine VMB (as shown in FIG. 7A) (S710). Since the mobile edge platform MEP_B already knows the location of the UE and UE context that needs to be migrated according to the above-mentioned UE Context Transfer message, the new UE context can be easily updated to the corresponding UE context.

After the virtual machine VMB updates the UE context C1 to the corresponding UE context therein, as shown in FIG. 7C, it replies the UE context management module 310B with a UE Context Response message at least including the UE identifier (UE1) and the data type of "Import" (S711). In response thereto, the UE context management module 310B transmits a UE Context Transfer Response message at least including the UE identifier (UE1) to the smart relocation management module 330B (S712).

The smart relocation management module 330B accordingly sends a UE Context Migration Complete message including at least the UE identifier (UE1) to the smart relocation management module 330A of the mobile edge platform MEP_A (S713).

On the source MEP MEP_A, as shown in FIG. 7B, the smart relocation management module 330A transmits the UE Context Migration Complete message including at least the UE identifier (UE1) to the UE context management module 310A (S714). After receiving the UE Context Migration Complete message, it indicates that the UE context C1 of the UE1 has been successfully migrated to the target MEP MEP_B, and the UE context management module 310A sends a UE Context Delete Request message including at least a UE identifier (UE1) and the UE context (C1) to be deleted to the virtual machine VMA A (UE Context) (S715). After deleting the UE context (C1) according to the UE Context Delete Request message, the virtual machine VMA sends a UE Context Response message including at least the UE identifier (UE1) and a data type of "Delete" to the UE context management module 310A (S716) to complete the handover of the UE context among the MEPs once. In another embodiment, the UE Context Delete Request message may also be sent from the smart relocation management module 330B to the smart relocation management module 330A for deleting the above-mentioned UE context that has been migrated. The above message sequence from FIG. 7A to FIG. 7C may be repeatedly executed each time it is necessary to switch the UE context of the cross-MEPs.

In some embodiments, since the service that needs to be migrated may not be directly used and can't be directly used for updating due to that it is not being enabled, the controller 220 of the MEP 200 may first determine whether the service is enabled, and if it is determined that the service is not enabled, starts the service. In one embodiment, before transmitting the second request including the pointer information to the source MEP in response to the request for enabling the first service, the MEP 200 may first detect whether a status of the first service is in an on status or an off status, and determine whether to perform a starting operation to start the first service based on the detected status of the corresponding service. In response to detecting that the status of the first service is in the off status, it indicates that the first service has not been started, and thus the MEP 200 performs a starting operation to start the first service and then requests the source MEP to perform a migration operation of the UE context after the first service is started. In another embodiment, when the MEP 200 is a source MEP, before sending the UE context to be migrated to a corresponding neighboring MEP (i.e., target MEP), the controller 220 may transmit a service status inquiry request to the target neighboring MEP via the communication device 210, and receive a migration response request message which indicates that the corresponding service has been started from the target neighboring MEP via the communication device 210, and transmit the UE context to the neighboring MEP in response to the migration response request message via the communication device 210.

Figure 8:
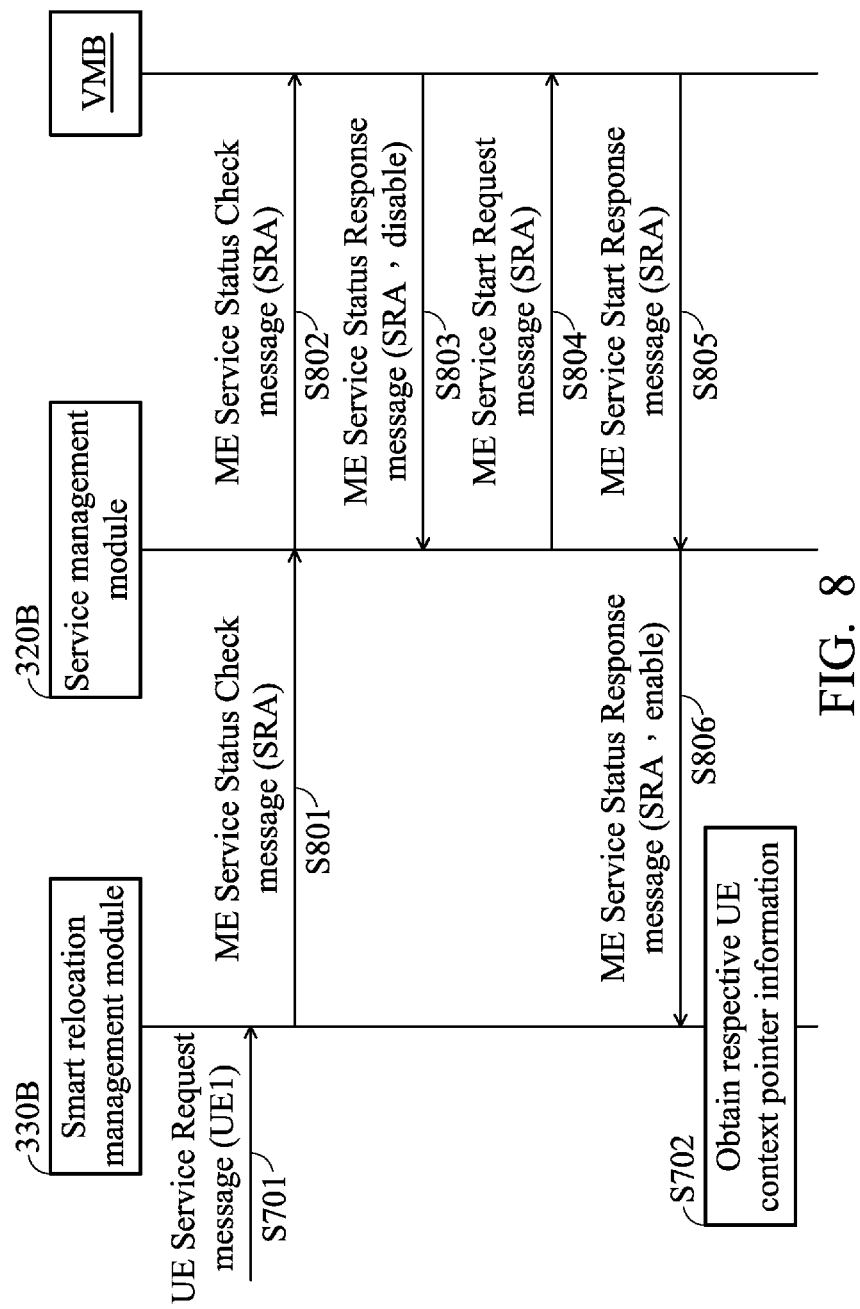
FIG. 8 is a message sequence chart illustrating the procedure for the UE context migration together with a service status query on a target mobile edge platform according to an embodiment of the application.

FIG. 8 is a message sequence chart illustrating the procedure for the UE context migration together with a service status query on a target MEP according to an embodiment of the application. Please refer together to FIGS. 7A~7C and FIG. 8.

When the smart relocation management module 330B receives the UE Context Service Request message at least including the UE identifier (UE_ID) and the MEP service identifier (SRA) (S701), the smart relocation management module 330B sends a service status inquiry request message (ME Service Status Check message) at least including a MEP service identifier (MEP_Service_ID) to the service management module 320B (S801). In this embodiment, the MEP service identifier is SRA.

In response to the ME Service Status Check message, the service management module 320B sends a ME Service Status Check message including at least a service identifier (SRA) to the virtual machine VMB (S802).

After receiving the ME Service Status Check message, the virtual machine VMB queries the status of the service corresponding to the service identifier (SRA) and sends to the service management module 320B a ME Service Status Response message at least including the service identifier (SRA) and a service status (Status) information according to the queried status result (S803). Among them, the service status information of a service can be set as "enable" or "disable", respectively, to indicate that whether the service is in an on or off status.

In this embodiment, assuming that the status data of the service SRA is set to be "disable", it indicates that the service SRA is not enabled/activated, the service management module 320B sends to the virtual machine VMB a ME Service Start Request message that includes at least a service identifier (SRA) to enable/start the service SRA in the virtual machine VMB (S804).

After the virtual machine VMB completes the starting operation corresponding to the service indicated by the service identifier, it sends the ME Service Start Response message including at least the service identifier (SRA) to the service management module 320B to inform the service management module 320B that the starting operation of the service has been completed (S805). The service management module 320B then sends a ME Service Status Response message including at least the service identifier SRA and the status information of "enable" to the smart relocation management module 330B (S806). After the smart relocation management module 330B receives the above-mentioned ME Service Status Response message, it determines that the service SRA to be migrated has been started according to its status information ("enable"), and then retrieves information within the UE context pointer information P1 corresponding to the UE1 (S702) and continues subsequent operation flow for the subsequent steps shown in FIGS. 7A~7C.

Methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

It should be noted that, the terms "first," "second," and so forth in the appended claims, are used merely as labels, and are not intended to impose any numerical requirements, any time order, priority order, or other relationship on the described elements, but rather are used to distinguish between different elements with the same name.

While the application has been described by way of example and in terms of exemplary embodiment, it is to be understood that the application is not limited thereto. Those who are skilled in this technology can still make various alterations and modifications without departing from the scope and spirit of this application. For example, the systems and methods described in the embodiments of the present APPLICATION may be implemented in physical embodiments of hardware, software, or a combination of hardware and software. Therefore, the scope of the present application shall be defined and protected by the following claims and their equivalents.

What is claimed is:

1. A user equipment (UE) context migration management method applied to a mobile edge platform for managing a UE context of a mobile communication device, comprising:
   receiving a migration completion indication of a mobile communication device;
   obtaining source platform information corresponding to the mobile communication device according to the migration completion indication, wherein the source platform information at least comprises location information of a source mobile edge platform; and
   transmitting a first request to the source mobile edge platform according to the source platform information to obtain pointer information of the UE context of the mobile communication device from the source mobile edge platform,
   wherein the pointer information at least indicates a location where the UE context of the mobile communication device locates and the location information of the source mobile edge platform,
   wherein the mobile edge platform connects to the source mobile edge platform and wirelessly connects to the mobile communication device, and the source mobile edge platform provides the UE context, and
   wherein each of the mobile edge platform and the source mobile edge platform is connected through a network interface to one or more base stations associated with the mobile communication device and a core network.

2. The UE context migration management method as claimed in claim 1, wherein the UE context corresponds to a first service and the method further comprises:
   receiving a request for enabling the first service from the mobile communication device; and
   transmitting a second request including the pointer information to the source mobile edge platform in response to the request for enabling the first service to request the source mobile edge platform to perform a migration operation of the UE context and to send the UE context to the mobile edge platform in response to the request for enabling the first service.

3. The UE context migration management method as claimed in claim 2, further comprising, before transmitting the second request including the pointer information to the source mobile edge platform in response to the request for enabling the first service:
   detecting whether a status of the first service is in an on status or an off status; and
   performing a starting operation to start the first service in response to detecting that the status of the first service is in the off status.

4. The UE context migration management method as claimed in claim 2, further comprising:
   transmitting a deleting request to the source mobile edge platform to request the source mobile edge platform to delete the UE context after the UE context is obtained.

5. The UE context migration management method as claimed in claim 1, further comprising:
   receiving a pointer transfer request from a neighboring mobile edge platform corresponding to a movement of the mobile communication device; and
   transmitting the pointer information to the neighboring mobile edge platform in response to the pointer transfer request.

6. The UE context migration management method as claimed in claim 1, further comprising:
   retrieving a neighboring platform information, wherein the neighboring platform information includes location information of a plurality of neighboring mobile edge platforms; and
   transmitting the pointer information to the neighboring mobile edge platforms according to the neighboring platform information.

7. A user equipment (UE) context migration management method applied to a mobile edge platform (MEP) for managing a UE context of a mobile communication device, comprising:
   receiving a first transfer request from at least one neighboring mobile edge platform corresponding to a movement of the mobile communications device;
   creating pointer information corresponding to the UE context in response to the first transfer request, wherein the pointer information at least indicates a location where the UE context locates and location information of the neighboring mobile edge platform; and transmitting the pointer information to the neighboring mobile edge platform, wherein the mobile edge platform connects to the neighboring mobile edge platform and wirelessly connects to the mobile communication device, and wherein each of the mobile edge platform and the at least one neighboring mobile edge platform is connected through a network interface to one or more base stations associated with the mobile communication device and a core network.

8. The UE context migration management method as claimed in claim 7, further comprising:

receiving a second transfer request from the neighboring mobile edge platform, the second transfer request including the pointer information; and performing a migration operation of the UE context to obtain the UE context and transmit the UE context to the neighboring mobile edge platform according to the pointer information in the second transfer request.

9. The UE context migration management method as claimed in claim 8, wherein the UE context corresponds to a first service and the method further comprises:

transmitting a service status inquiry request corresponding to the first service to the neighboring mobile edge platform before transmitting the UE context to the neighboring mobile edge platform;

receiving a migration response request message from the neighboring mobile edge platform, the migration response request message indicating that the first service has been started; and transmitting the UE context to the neighboring mobile edge platform in response to the migration response request message.

10. The UE context migration management method as claimed in claim 8, further comprising:

receiving a deleting request from the neighboring mobile edge platform after transmitting the UE context to the neighboring mobile edge platform; and deleting the UE context in response to the deleting request.

11. A mobile edge platform server, applied to a mobile edge computing network, comprising:

a mobile edge platform, comprising:

a communication device configured to perform signal transmission and reception with at least one source mobile edge platform and wireless transmission and reception with a mobile communication device, wherein the source mobile edge platform provides a user equipment (UE) context; and a controller configured to receive a migration completion indication of a mobile communication device via the communication device, obtain source platform information corresponding to the mobile communication device according to the migration completion indication, and transmit a first request to the source mobile edge platform via the communication device according to the source platform information to obtain pointer information of the UE context of the mobile communication device from the source mobile edge platform via the communication device, wherein the source platform information at least comprises location information of the source mobile edge platform and the pointer information at least indicates a location where the UE context locates and the location information of the source mobile edge platform, and wherein each of the mobile edge platform and the source mobile edge platform is connected through a network interface to one or more base stations associated with the mobile communication device and a core network.

12. The mobile edge platform server as claimed in claim 11, wherein the UE context corresponds to a first service and the controller further receives a request for enabling the first service from the mobile communication device via the communication device and transmits a second request including the pointer information to the source mobile edge platform via the communication device in response to the request for enabling the first service to request the source mobile edge platform to perform a migration operation of the UE context to send the UE context to the mobile edge platform.

13. The mobile edge platform server as claimed in claim 12, wherein the controller further detects whether a status of the first service is in an on status or an off status and performs a starting operation to start the first service in response to detecting that the status of the first service is in the off status.

14. The mobile edge platform server as claimed in claim 12, wherein the controller further transmits a deleting request to the source mobile edge platform via the communication device to request the source mobile edge platform to delete the UE context after the UE context is obtained.

15. The mobile edge platform server as claimed in claim 11, wherein the controller further receives a pointer transfer request from a neighboring mobile edge platform corresponding to a movement of the mobile communication device via the communication device and transmits the pointer information to the neighboring mobile edge platform via the communication device in response to the pointer transfer request.

16. The mobile edge platform server as claimed in claim 11, wherein the controller further receives retrieves a neighboring platform information, wherein the neighboring platform information includes location information of a plurality of neighboring mobile edge platforms, and transmits the pointer information to the neighboring mobile edge platforms via the communication device according to the neighboring platform information.

17. A mobile edge platform server, applied to a mobile edge computing network for managing a user equipment (UE) context of a mobile communication device, comprising, comprising:

a mobile edge platform, comprising:

a communication device configured to perform signal transmission and reception with at least one neighboring mobile edge platform and wireless transmission and reception with the mobile communication device; and a controller configured to receive a first transfer request from the neighboring mobile edge platform corresponding to a movement of the mobile communications device via the communication device, creates pointer information corresponding to the UE context in response to the first transmission request, and transmits the pointer information to the neighboring mobile edge platform, wherein the pointer information at least indicates a location where the UE context locates and location information of the neighboring mobile edge platform, and wherein each of the mobile edge platform and the at least one neighboring mobile edge platform is connected through a network interface to one or more base stations associated with the mobile communication device and a core network.

18. The mobile edge platform server as claimed in claim 17, wherein the controller further receives a second transfer request from the neighboring mobile edge platform via the communication device, the second transfer request including the pointer information, and performs a migration operation of the UE context to obtain the UE context and transmits the UE context to the neighboring mobile edge platform according to the pointer information in the second transfer request.

19. The mobile edge platform server as claimed in claim 18, wherein the UE context corresponds to a first service and the controller further transmits a service status inquiry request corresponding to the first service to the neighboring mobile edge platform via the communication device before transmitting the UE context to the neighboring mobile edge platform via the communication device, receives a migration response request message from the neighboring mobile edge platform, the migration response request message indicating that the first service has been started, and only transmits the UE context to the neighboring mobile edge platform in response to the migration response request message.

20. The mobile edge platform server as claimed in claim 18, wherein the controller further receives a deleting request from the neighboring mobile edge platform via the communication device after transmitting the UE context to the neighboring mobile edge platform via the communication device, and deletes the UE context in response to the deleting request.

* * * * *